Dec. 25, 1945. F. D. PRAGER 2,391,738
LIQUID TREATING APPARATUS
Filed Dec. 8, 1941 3 Sheets-Sheet 1

INVENTOR.
Frank D. Prager

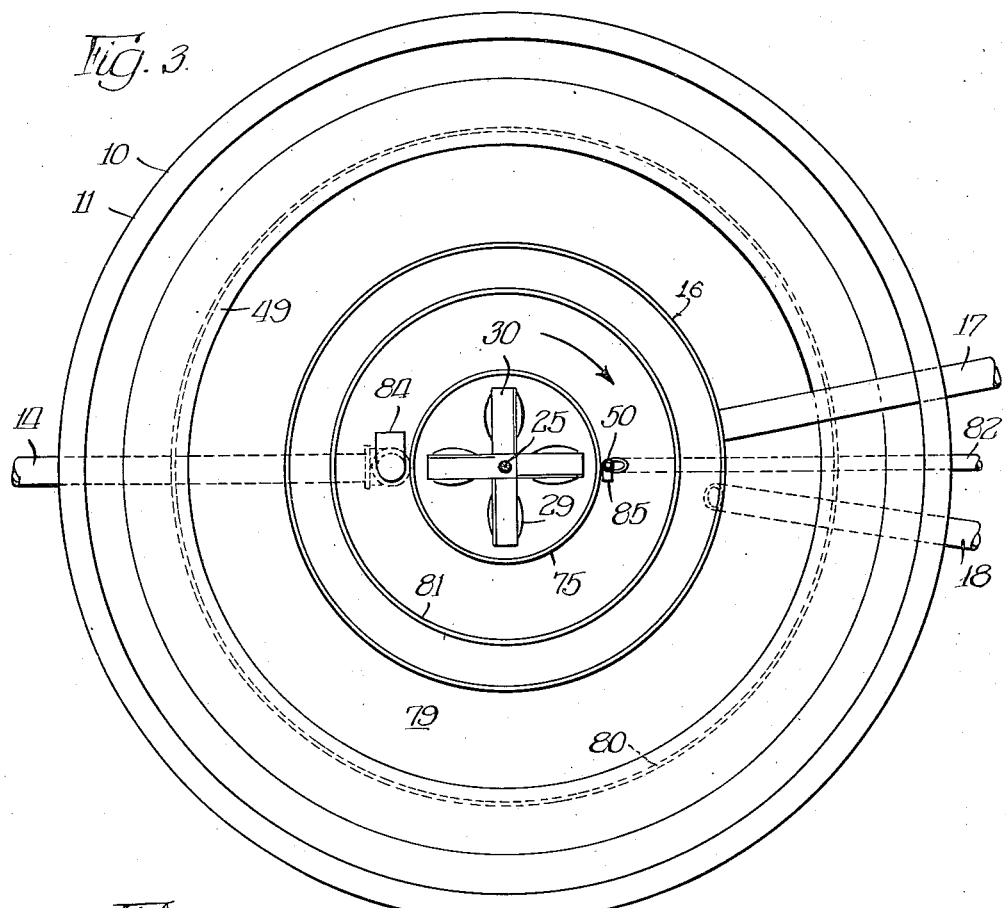
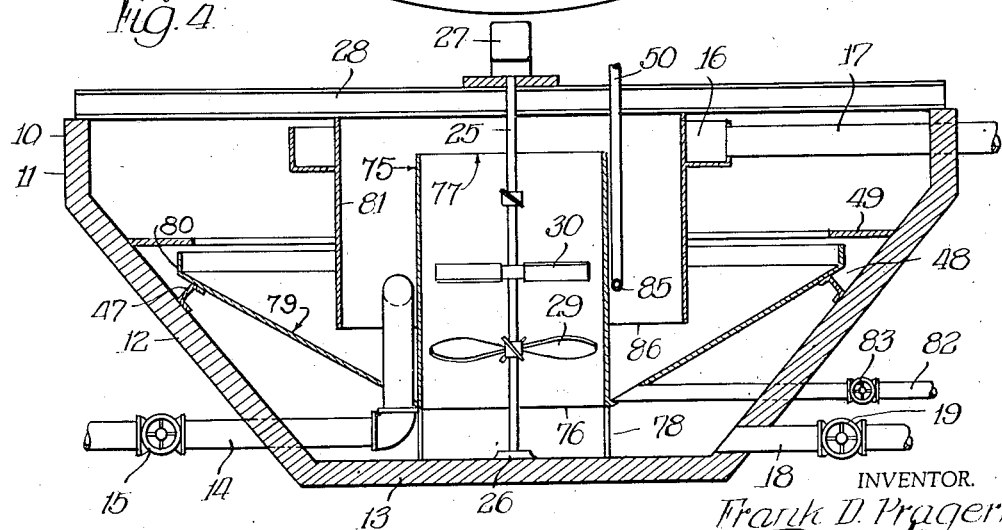

INVENTOR.
Frank D. Prager

Patented Dec. 25, 1945

2,391,738

UNITED STATES PATENT OFFICE 2,391,738

LIQUID TREATING APPARATUS

Frank D. Prager, Chicago, Ill., assignor to Infilco Incorporated, a corporation of Delaware Application December 8, 1941, Serial No. 422,094

12 Claims. (Cl. 210—16)

This invention relates to the treatment of liquids and has reference to an improved method and apparatus for the treatment of liquid to remove undesirable substances therefrom and particularly for the removal of such substances by reacting the liquid to be treated in a circulating slurry comprising suspended particles separated and accumulated from previously treated liquid.

One of the principal objects of the invention is to provide an improved apparatus for the treatment of liquid to remove dissolved, suspended or colloidal matter therefrom.

Another object of the invention is the provision of an apparatus for the purification of water involving the maintenance of a dense slurry consisting of suspended particles previously separated from water, the addition of the treating reagent to raw water in the presence of a major portion of such slurry, and the separation of the solids from a relatively rapid, horizontally extending, flow of such slurry.

A further object of this invention is to provide an improved apparatus for forming precipitates in raw water and for the prevention of sedimentation of such precipitates during treatment, and the final separation of such precipitates from a relatively rapid flow of such treated water.

Still another object of this invention is to provide an improved process and apparatus for liquid treatment by a process including the treatment of the liquid in and with a circulating slurry containing suspended particles separated and concentrated from previously treated liquid and the final separation of treated liquid and excess solids from such slurry, such improvement comprising means for maintaining a substantially uniform velocity of flow in part of the path of circulation of slurry whereby the maintenance of the slurry is facilitated.

A still further object of the invention is to provide an improved process and apparatus for the treatment of water by a circulating slurry process, which comprises treating the raw water with a reagent in the presence of a dense slurry of previously precipitated particles in a zone of turbulent agitation in the lower part of a reaction chamber, flowing the water and suspended solids outwardly and upwardly therefrom, and returning the slurry to the turbulent agitation zone by a superimposed inward return flow, maintaining the velocity of such flow substantially uniform, particularly in the return portion of such flow, and separating solids and clarified water from said mixture in said return flow.

A particular object is to provide an improved form of apparatus of the type referred to wherein the maintenance and circulation of the slurry, and the mixing and treatment of the water therewith, is facilitated.

These and other objects will be apparent from a consideration of the specification and claims which follow.

For many years it has been generally considered axiomatic that clarifying a turbid water or softening a hard water by the lime-soda process required a very gentle agitation in the flocculation or coagulation step, followed by a prolonged holding in a quiet sedimentation chamber. For example, in the removal of turbidity imparting solids from water, the coagulating or flocculating steps customarily allowed gentle agitation by limiting peripheral agitator speed to not more than two feet per second for a period of from fifteen to sixty minutes, followed by two to four hours retention in a quiescent settling chamber. The agitation has customarily been applied in a flocculating zone by means of slowly moving paddles, and good practice was thought to require paddle speeds not exceeding 2½ feet per second and usually not more than 1½ to 2 feet per second. The object was to provide gentle agitation to induce collision between the newly formed floc and turbidity imparting solids in order to aggregate minute particles into larger aggregates that would settle more readily. It was found necessary to avoid higher speeds than those mentioned, as more turbulent agitation caused disintegration of the delicate, newly formed particles or flocs. The particles formed by this method of flocculation are sometimes large but are always light and very delicate, and settle but slowly. It was therefore necessary to provide relatively large sedimentation chambers. Usually the sedimentation chamber or clarifier was made sufficiently large to permit retention of the treated water within it for periods up to five hours or more to allow time for the depositing of these light and delicate flocs. Necessarily the flocculating apparatus and the sedimentation chamber had to be of large size and were expensive to build and operate. In the softening of water the situation was the same. For nearly fifty years the well-established practice has been to gently stir the raw water after mixing with softening chemicals such as lime or lime-soda, followed by prolonged retention in a sedimentation compartment. The velocity of the agitator blades and the length of time required for the process was comparable to that of removing turbidity by coagulation.

A very great improvement in the art of water treatment is disclosed in the recent patents to Walter J. Hughes, No. 2,245,587 and No. 2,245,588, which relate to what is now commonly known as the "slurry treatment." The Hughes inventions provide a method of treating liquid in which the liquid is reacted in and with a turbulently circulating slurry containing suspended particles formed in and separated and concentrated from previously treated liquid, clear water being caused or allowed to escape directly from the upper surface of the circulating slurry and excess solids also being withdrawn to waste from such slurry. This process is distinguished from the older art by the much greater agitation provided in the mixing zone, by the repeated recirculation of the slurry, by the much greater concentration of solids in the slurry, by the prevention of sedimentation of solids from the circulating slurry, and by the "squeezing" of clear treated water from the sharply defined interface between the circulating slurry and the clear water. The process is much more rapid and secures much better results than anything known in the old art.

It will be understood that in the practice of the slurry process, the incoming water should be mixed into or with two or three times its own volume of slurry, and that it should be recirculated several times through the turbulent mixing and reaction zone. It is also necessary that the solid particles be maintained in suspension until they are withdrawn to waste, as it has been found that sedimented and resuspended particles are not as suitable for the reaction as those constantly maintained in suspension.

The prevention of sedimentation of solids from the circulating liquid undergoing treatment is one of the important features of the slurry treatment. However, it has been found in large apparatus heretofore used in such treatment that the pattern of circulation sometimes permitted the depositing or sedimentation of solids from the circulating liquid. This was due to the fact that most such apparatus provided a central mixing zone and either (a) a downward flow therethrough, discharging the slurry from conduits located on the floor and picking up the return flow at a point thereabove (which permitted solids to settle on the floor between the discharge conduits) or (b) an upward flow through such zone, the circulating liquid discharging outwardly at an intermediate level in the tank with return to the bottom (which causes the velocity of the outwardly discharged liquid to decrease as the distance from the discharge increases, and thereby permitting the depositing of solids therefrom). Treating devices heretofore proposed work satisfactorily in smaller sizes, but in larger installations there is some tendency toward sedimentation as particles formed in the slurry treatment are quite heavy. The most common form of such apparatus provides for the discharge of the slurry horizontally from the central mixing chamber outwardly above a downwardly inclined horizontally extending surface into the relatively quiescent zone wherein clear water separation occurs and its return underneath the inclined surface into the mixing zone. This involves a rapidly decreasing velocity due to increase in the cross-section of the flow, and as the liquid is heavily charged with suspended particles such decrease in velocity tends to permit a deposit of solids on the dividing surface, which is undesirable in this type of treatment. The effect of this slowing down is overcome by a greater volume or rapidity of circulation than would otherwise be necessary to keep the velocity above the permissible minimum.

The present invention involves an improved type of apparatus which overcomes the tendency to deposit found in the older type of construction. I have found substantial advantage by departing from the form of apparatus and direction of flow used hitherto. Thus, instead of discharging outwardly from the center I direct my circulation into the quiescent zone inwardly from the periphery toward the center, and instead of sloping the dividing wall outwardly and downwardly I slope it inwardly and downwardly. In this way I avoid the considerable reduction in flow velocity that inevitably takes place with the older apparatus and operation. Instead I can, by the degree of slope I give my dividing wall, keep the flow area and velocity constant, or even decrease the area and increase the velocity. The advantages of this are obvious. Thus, by my new form of apparatus and operation I am able to control velocity of flow and other conditions in the slurry in a manner not possible heretofore. An important aspect of my invention lies in the positive provision of means for controlling the velocity of the circulating slurry. By avoiding the wide fluctuation in the velocity of the flow at different points in the path of circulation, I am able to secure improved results from the slurry treatment.

My invention also embodies an improved method of removing from the slurry the excess solid particles formed in the treatment. It is obvious that in the operation of a slurry treatment the removal of the excess solids is a very important and sometimes very troublesome factor. Even in the old art, the process of handling solids removed from the water was very important. The slurry process, which increases the speed of reaction and decreases the time of retention, produces much greater quantities of solids within the same space and time than theretofore known and therefore requires special provision for handling the solids.

When considered as a process my invention comprises maintaining in a slurry treatment a fairly constant velocity in important parts of the path of the circulating slurry. Briefly the apparatus of my invention comprises a treating tank, preferably one provided with a sloping or hopper bottom, an inverted frusto-conical partition member in the lower part of the tank, a mixing chamber communicating with the underside of the partition, a stream projecting impeller adapted to direct a flow downwardly through said mixing chamber and outwardly underneath said partition, a central upper communication into said mixing chamber whereby liquid discharged at the periphery of the tank may be returned to the mixing chamber for further treatment, and a solids removal chamber with its inlet communicating with the return flow above the partition.

Preferred embodiments of the apparatus of the present invention are shown in the accompanying drawings which form a part of this specification, and in which like reference characters in the several figures designate similar elements.

Figure 3 is a plan view of another embodiment of my invention.

Figure 4 is a cross-sectional view of the embodiment shown in Figure 3.

The apparatus in each of the embodiments comprises a tank, 10, preferably provided with a vertical wall, 11, a sloping wall or hopper bottom, 12, and a floor, 13. Water to be treated is introduced through a raw water conduit, 14, which may be provided with a suitable regulating valve, such as 15. Treated water is withdrawn through suitable withdrawal means, such as overflow launder, 16, in the upper portion of the tank, which communicates with effluent conduit, 17. The entire contents of the tank can be drained through a suitable drain, 18, provided with a regulating valve, 19.

Coaxially aligned in the tank, 10, is a shaft, 25, journaled in a suitable bearing, such as 26, and driven by a motor and suitable reducer, 27. Motor and reducer are supported above the top of the tank by any suitable means, such as beams, 28. To the shaft, 25, is affixed a propeller or stream projecting impeller, 29, and suitable agitating bars, such as 30.

Figure 1:
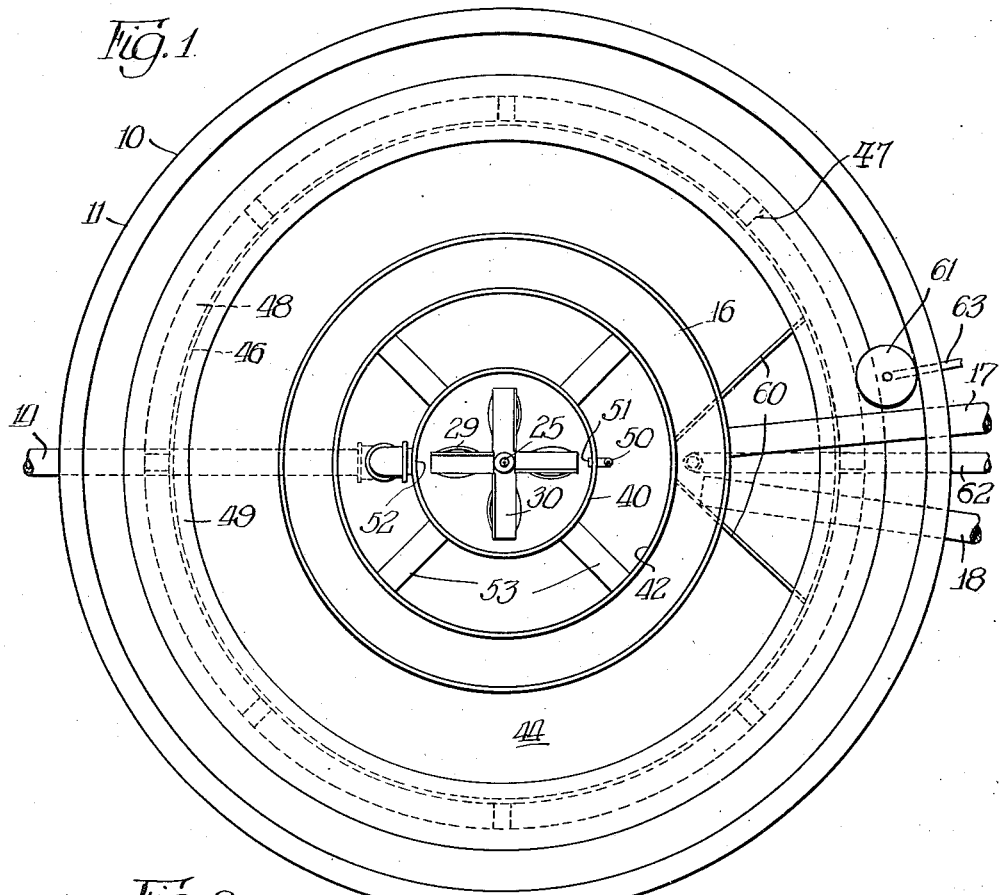
Figure 1 is a plan view of one embodiment of my invention.
Figure 2:
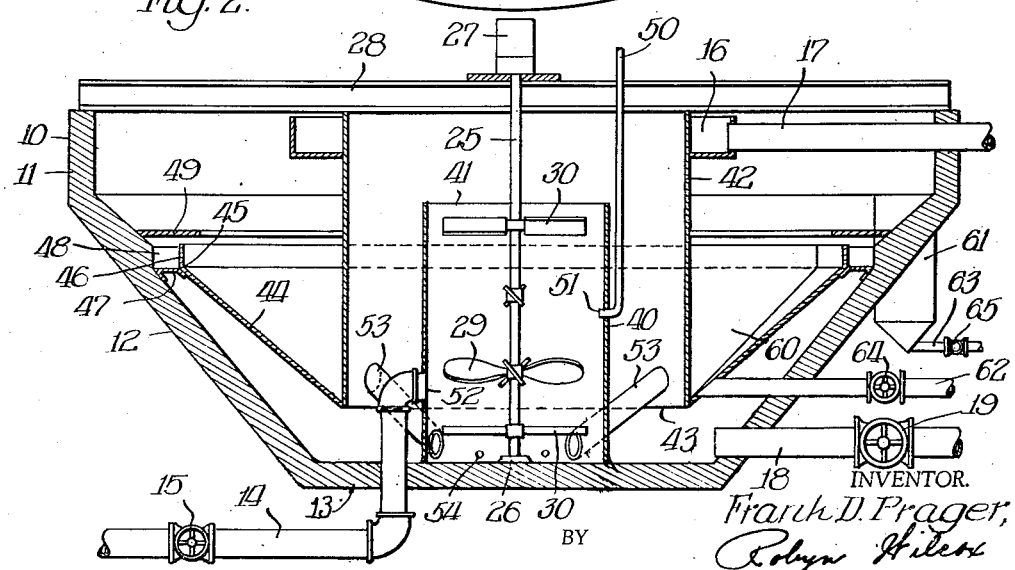
Figure 2 is a cross-sectional view of the embodiment shown in Figure 1.

In the embodiment shown in Figures 1 and 2 the stream projecting impeller, 29, is enclosed in an inner housing formed by a partition, 40, coaxially aligned with the shaft, 25. The partition, 40, extends upwardly from the floor, 13, and is open at its upper end, 41, which is located intermediate the floor, 13, and the top of the tank. Concentrically arranged around the inner housing, 40, is an outer housing formed by a partition, 42, which may be supported by beams, 28, and which in turn supports the overflow launder, 16. The partition, 42, extends downwardly from adjacent the level of the top of the tank and terminates, as at 43, in a plane slightly above the floor, 13, of the tank and is open at the bottom as shown at 43. An inverted frusto-conical baffle, 44, is affixed to the lower open end, 43, of the outer partition, 42, and extends upwardly and outwardly therefrom to adjacent the wall of the tank, as at 45. A low vertical wall, 46, may be affixed to the upper rim, 45, of the baffle, thereby forming an outlet, 48, from the agitation zone underneath the baffle, which discharges into the upper quiescent section of the tank. The cone may be supported by any suitable brackets, such as 47. Preferably the conical baffle or partition, 44, will be so constructed and arranged as to provide a passageway of decreasing depth as it goes from the outer partition, 42, to the periphery of the tank. This construction provides for a passageway of substantially uniform cross-sectional area in all planes normal to the axis of the tank, as the depth or width of the pasasgeway can decrease in proportion to the increase in the circumference. Slightly above the outlet, 48, formed between the base of the cone, 45, and the wall, 12, of the tank is a deflecting baffle, 49, so constructed as to direct the flow of liquid discharged from underneath the cone toward the center of the tank.

A chemical feed line, 50, discharges into the mixing and reaction chamber formed by the housings, at any suitable point, as inside the inner partition, 40, at 51; and the raw water conduit, 14, likewise discharges into the mixing and reaction chamber, as at 52. The raw water and the chemicals can be mixed together prior to discharge into the reaction tank, but I have found that in most cases it is preferable to introduce them separately, and better yet, to introduce them in such a manner that the one is rather well mixed with the slurry prior to the introduction of the other. It is obvious that equally good results could be secured by introducing the chemical to the slurry below the impeller, 29, and the water thereabove. A plurality of conduits, 53, connect the annular compartment formed between the outer partition, 42, and the conical partition, 44, with the portion of the mixing and reaction chamber within the inner partition, 40. A plurality of small communications, 54, may be placed in the inner partition, 40, for returning liquid to the inner housing from the outer housing, but ordinarily such communications are not necessary.

Excess solids may be removed from the apparatus by a suitable sludge collecting pocket or pockets which may be formed in several ways. Preferably, a pocket will be placed so that its inlet communicates with the return flow above the conical baffle. It may be constructed on the upper side of the conical baffle, 44, and may be formed by any suitable means, as by partitions 60, extending from the upper rim, 45, of the conical baffle, 44, to the outer partition, 42, as shown in Figure 1. If more than one such pocket is necessary or desirable, a plurality can be provided between the various return conduits, 53. The pockets should be placed in such a position as not to interfere with the return flow to and through conduits, 53. The sludge collecting pocket may take the form of an auxiliary chamber, 61, formed adjacent the outer wall of the tank and with its inlet placed preferably above the flow opening, 48. In either event, the pockets are provided with suitable waste lines, 62 or 63, respectively, which may be equipped with suitable control valves, 64 or 65.

The construction above described provides for a return flow of the circulating slurry to the mixing zone at a substantially constant velocity. This is the most critical portion of the circulation. The flow immediately after its discharge from the mixing zone into the flow passage under the baffle is somewhat turbulent which to some extent prevents sedimentation, so that careful control of velocity at this stage is not so vitally important as it is after the discharge into the slurry pool. However, after the discharge of the slurry from such flow passage into the slurry pool, I have found that control of velocity is very important. In older apparatus there was a considerably greater tendency for solids to settle from the unconfined circulation through the slurry pool than elsewhere, due to the decrease in velocity at this portion. I find that greatly improved operation can be secured in the slurry process if the velocity is maintained in and through the slurry pool. The apparatus of my invention secures the necessary uniformity of velocity as the circulating slurry is discharged at the periphery of the tank and flows toward the center, which tends to maintain the velocity of the flow. It is therefore evident that in the critical portion of the slurry circulation I am able to maintain velocity at a rate sufficiently high to prevent sedimentation without unduly increasing velocity in other parts of the flow.

It is believed that the operation of the apparatus disclosed in Figures 1 and 2 will be readily understood. Water is introduced through the inlet conduit, 14, and is circulated in a closed path by the impeller, 29. In this embodiment the impeller is, of course, set to direct an upward flow through the inner housing to the upper end, 41, of the inner partition, 40, where it passes into the outer housing downwardly therethrough and around the lower end, 43, of the outer partition 42 upwardly and outwardly under the conical baffle, 44, and is discharged into the upper portion of the tank, as at 48. The deflecting baffle, 49, directs the discharge of water laterally and inwardly so as to prevent disturbing the liquid in the upper portion of the tank. A major portion of the water issuing from the discharge opening, 48, returns to the inner portion of the mixing chamber formed by the inner housing, 40, through conduits, 53. The shape, number and size of the return conduits, 53, can be so selected that they are ample to return a major portion of the flow of the circulation to the mixing and reaction zone, it being desired in apparatus of this type to provide for mixing the water to be treated with a volume of slurry considerably in excess of its own volume. Each of the conduits may be of a size comparable to the raw water conduit, 14, so as to provide for four or five times the amount of slurry for the incoming water. Excess solids can be separated from the liquid in the sludge pockets, such as that formed by the partitions, 60, or by chamber, 61, through conduits, 62 or 63, respectively.

It is believed obvious that a circulation such as described will avoid the tendency present in former apparatus of sedimentation of solids from the circulating slurry. The normal tendency of velocity to decrease in a flow from the center to the periphery of the tank can be prevented by decreasing the depth of the conduit formed by the tank wall and the conical baffle, 44, so that the outward flow is always of substantially the same velocity, thereby preventing sedimentation therein. The normal tendency of a confined return flow, as it passes from the periphery to the center of the tank, would be to increase in velocity as it approaches the center of the tank. This tendency can be counteracted by permitting the return flow to be unconfined. In this way velocity of the return flow will also be substantially constant, thereby avoiding undesirable eddies and disturbances while preventing sedimentation in any part of the circulation. Excess solids can be removed through the solids collecting pocket, which can be operated to control the amount of solids removed from the apparatus. It will be obvious that above the deflecting baffle, 49, quiescent conditions will exist within the tank, and that clarified liquid separated or "squeezed" out of the circulating slurry can rise through the clarified liquid zone and be withdrawn through the overflow launder, 16.

The apparatus shown in Figures 3 and 4 is somewhat simpler than that shown in Figures 1 and 2, but operates on the same principle. An inner housing or partition, 75, is coaxially aligned with the propeller shaft, 25, and is of such size and so arranged as to cooperate with the propeller, 29, to cause a flow of liquid therethrough. The inner partition, 75, is open at both ends, the lower end, 76, being spaced above the floor, 13, and the upper end, 77, being located a short distance below the liquid level in the tank, which is established by the overflow launder, 16. The inner partition, 75, may be supported by any suitable means, as by legs 78. In this embodiment, the impeller, 29, is so constructed as to direct the flow downwardly through the housing 75, toward the floor, 13, of the tank. A frustoconical baffle, 79, extends from the lower end, 76, of the inner partition, 75, outwardly and upwardly to adjacent the sloping wall, 12, of the tank and terminates in a vertical wall, 80. The conical baffle may be supported by brackets, 47, or other suitable means, and a deflecting baffle, 49, should be placed above the annular outlet, 48, to prevent turbulence in the upper portion of the tank. An outer housing or partition, 81, surrounds the upper portion of the inner housing, 75, extending downwardly from an elevation above the liquid level within the tank to an open end, 86, located at a level below the upper wall, 80, of the conical baffle, 79. In this embodiment the lower part of the space between the inner partition, 75, and the conical baffle, 79, forms a sludge collecting pocket from which solids can be removed to waste through any suitable waste outlet, such as pipe, 82, provided with suitable valve means, 83. Water to be treated and a chemical reagent can be introduced into the circulation at any suitable point. I may introduce both the chemical and the liquid into the inner portion of the mixing chamber, i. e. within the inner housing, 75, but for purposes of illustration I have shown the raw water feed line, 14, and the chemical conduit, 50, as discharging into the outer, or annular portion thereof, i. e. between the inner and outer partitions. Preferably, both will be provided with outlets, 84 and 85, respectively, discharging in the direction of rotation as shown in Figure 3. As in the case of the apparatus shown in Figures 1 and 2, it is preferable that the water to be treated and the chemical be separately mixed with the slurry in which the reaction occurs. In apparatus of this type it is often desirable to introduce the chemical reagent in front of the stream projecting impeller, 29, and the water immediately thereafter. In the embodiment shown in Figures 3 and 4 it will be seen that the chemical and water are separately introduced into the circulating slurry, but both are added prior to the return of slurry to the portion of the mixing zone formed by the inner housing, 75.

The operation of this type of apparatus will be readily understood. After a period of preliminary treatment the liquid in the lower portion of the tank contains a large amount of solids separated from previously treated water, thereby forming a slurry which may contain up to 10 per cent solids. Water to be treated is introduced through raw water inlet, 84, and discharges into the chamber formed by the inner and outer housing. Chemical reagent is also introduced into the chamber formed by the two housings, some mixing being accomplished by the rotation imparted to the liquid by the discharge from the inlets. The mixture of slurry, water to be treated, and the chemical reagent passes into the inner mixing chamber where it is turbulently agitated by the agitating bars, 30, and is impelled with considerable velocity downwardly through the mixing chamber and out through the annular passageway formed by the bottom of the tank and the conical baffle, 79. The water issues from the annular outlet, 48, is deflected inwardly by the deflecting baffle, 49, passes over the upper surface of the conical baffle, 79, and is drawn into the open lower end of the outer partition, 81, and the cycle is again repeated. Solids separated from the return flow across the upper surface of the conical baffle are collected in the pocket formed by the inner partition, 75, and the conical baffle, 79, and may be withdrawn to waste as required. If desired, a solids separation pocket, such as auxiliary chamber, 61, in Figures 1 and 2, may be used in this form of apparatus.

Figure 5:
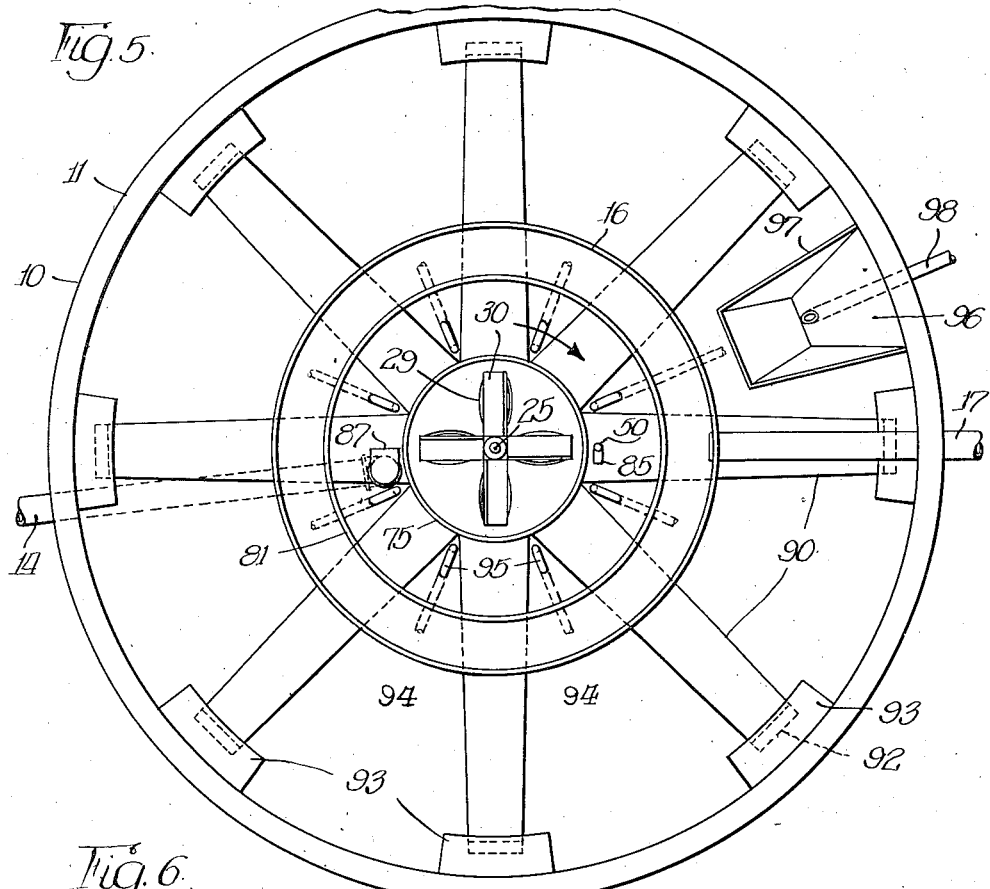
Figure 5 is a plan view of a still further embodiment of my invention.
Figure 6:
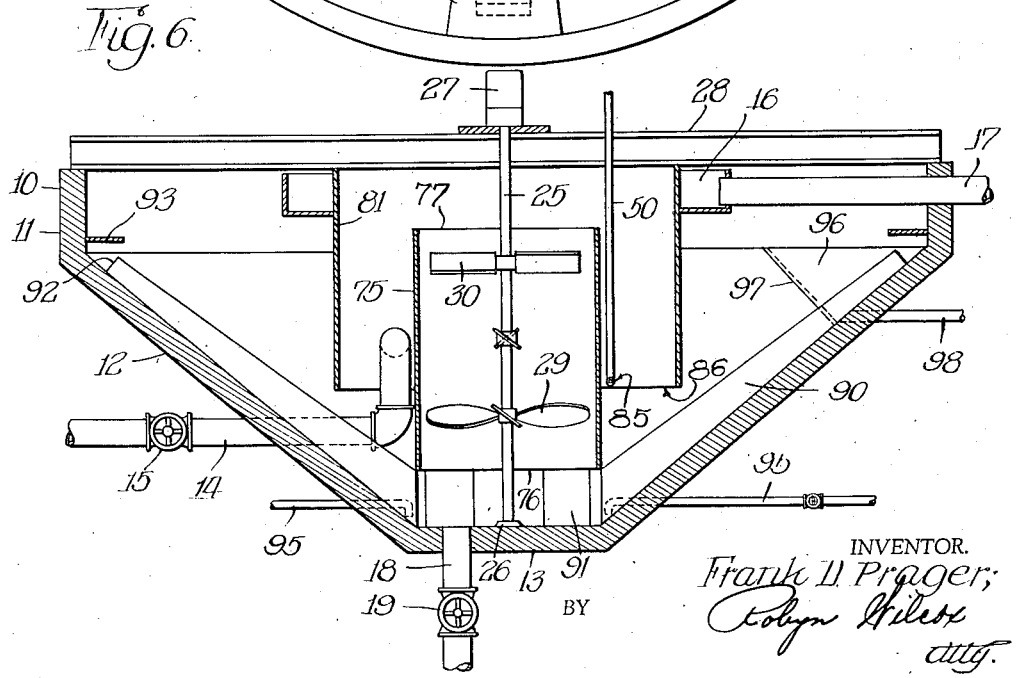
Figure 6 is a cross-sectional view of the embodiment shown in Figure 5.

The embodiment shown in Figures 5 and 6 is similar in operation to that shown in Figures 3 and 4 and differs therefrom only in the fact that instead of a singular annular passageway formed by the sloping bottom, 12, and the frusto-conical baffle, 79, as shown in Figure 4, a plurality of upwardly extending conduits, 90, are provided. In this form of apparatus the inner and outer housings are similar to those shown in Figures 3 and 4 so need not be described in detail. In this embodiment the conical baffle, 79, is replaced by a plurality of circulation conduits, 90, which extend from the lower end, 76, of the inner partition, 75, outwardly to outlets, 92, adjacent the peripheral wall of the tank. The circulation conduits, 90, are provided with inlets, 91, which communicate with the chamber within the inner housing, 75. In order to maintain the desired circulation, the inner housing extends to the floor of the tank, or the circulation conduits extend around the periphery of the housing so that circulating slurry will not escape into the upper part of the tank. In this embodiment, also, a deflecting baffle, 93, may be placed over the discharge end, 92, of each conduit in order to prevent an upward jet of slurry in the upper part of the tank. Solids separated from the liquid can be collected in the pockets, 94, formed by the sloping side walls, 12, of the tank and between the respective circulation conduits, 90, as shown in Figure 5, and removed by suitable solids waste discharge lines, 95, as shown. Solids collecting pockets, 96, can also be arranged around the periphery of the tank, as shown in Figures 5 and 6, in which the partitions, 97, together with the sloping wall, 12, form a pocket adjacent the periphery of the tank, the open top of which is approximately at the level of the discharge openings, 92, of the conduits, 90. Solids may be withdrawn to waste from the pocket, 96, through sludge conduit, 98. Obviously, several such pockets may be utilized when the amount of solids to be removed warrants. The top of the walls, 97, of these sludge collecting pockets, 96, can be higher or lower than the level of the flow openings, 92, there being no fixed level at which they should be placed.

The operation of the embodiment shown in Figures 5 and 6 is similar to that shown in Figures 3 and 4. A mixture of slurry, water to be treated, and chemical reagent is circulated downwardly in the inner portion of the mixing and reaction chamber, i. e. in the inner housing, 75, passes upwardly and outwardly through the conduits, 90, and is deflected inwardly by the deflecting baffles, 93. The return circulation passes downwardly and inwardly from the periphery of the tank and is drawn into the open lower end, 86, of the outer partition, 81, and returns to the mixing and reaction zone, and the treatment is repeated. As in the former embodiments, clarified liquid is separated or squeezed out of the circulating slurry and passes into the quiescent upper portion of the tank from where it is withdrawn by the launder, 16.

It will be evident that by the means employed in the embodiments of my invention it is possible to overcome the normal tendency of solids to separate from the circulating slurry particularly in the critical flow in the relatively quiescent portion of the circulation. In apparatus adapted for the slurry treatment the particles of solids are much denser than in the old flocculation process and therefore tend to sediment much more rapidly than the old type of floc. In treatment of this type sedimentation is to be avoided, and I have found that greatly improved results can be secured, especially in larger installations, by the apparatus of my invention. The apparatus of my invention provides a circulation of slurry with a substantially constant velocity, whereby sedimentation from the circulating slurry is prevented. Improved results are thereby secured.

Manifestly, many modifications and variations of the invention hereinabove set forth may be made by persons skilled in the art without departing from the spirit and scope hereof. Accordingly, the appended claims are to be given an interpretation commensurate with the novelty herein described and as broad as may be permitted by the prior art.

I claim:

1. In liquid treating apparatus of the type wherein liquid to be treated is mixed with and subjected to reaction in and with a circulating slurry comprising suspended particles separated and accumulated from previously treated liquid, a tank, a partition structure in said tank forming therein a central mixing and reaction chamber, an outlet communicating said central chamber with the lower central portion of said tank, a power driven stream projecting impeller in said mixing chamber, a second partition structure secured to said first partition structure and forming a channel for liquid flow leading from said outlet and extending upwardly and outwardly to adjacent the periphery of the tank, a discharge opening from the upper end of said channel adjacent the periphery of the tank, said opening being at a level above that of said outlet, an inlet to said mixing and reaction chamber from an elevation in said tank below said discharge opening, means for introducing liquid to be treated and a precipitating reagent into the mixing and reaction chamber, means for withdrawing clarified liquid from the upper portion of said tank, and a waste discharge from said tank.

2. In liquid treating apparatus of the type wherein liquid to be treated is mixed and reacted in and with a circulating slurry comprising suspended particles separated and accumulated from previously treated liquid and treated liquid is separated from such slurry, a tank, means for withdrawing treated liquid from the upper portion of said tank, a partition structure in said tank forming therein a central mixing and reaction chamber, an outlet from said mixing and reaction chamber into the lower portion of said tank and an inlet into said mixing and reaction chamber from said tank at an elevation vertically remote from said means for withdrawing treated liquid, partition means forming a conduit leading from the mixing and reaction chamber outlet upwardly and outwardly to closely adjacent the periphery of the tank, baffle means above said outlet so constructed and arranged as to deflect liquid discharged from said conduit horizontally inwardly in said tank, a stream projecting impeller so positioned as to cause a turbulent circulation of slurry in and through said mixing and reaction chamber, through said conduit and through the central portion of said tank back to said mixing and reaction chamber through said inlet, means for introducing liquid to be treated into the circulation of slurry caused by the said impeller, and a waste discharge from said tank.

3. Apparatus of the type described comprising a tank, an inclined partition dividing said tank into a lower chamber and an upper chamber, a passageway between said chambers adjacent the periphery of the tank, baffle means above said peripheral passageway positioned to deflect liquid entering the upper chamber through said passageway inwardly, a second passageway between said chambers adjacent the center of the tank and at an elevation below that of said first passageway, means including a stream projecting impeller adjacent said central passageway and so constructed and so positioned relative to said partition and said central passageway as to cause, on operation thereof, a turbulent closed type circulation of liquid from said central passageway through said lower chamber and said peripheral passageway and back to said central passageway along the upper surface of said partition, a prime mover operatively connected to said impeller, means for introducing liquid to be treated into said tank adjacent said impeller, means for introducing a precipitating reagent to said liquid, an outlet for treated liquid from the upper portion of said tank and a waste outlet from said tank.

4. In apparatus of the type described, a tank, a vertically extending cylindrical partition centrally disposed in said tank and forming therein a mixing chamber, an outlet from said mixing chamber adjacent the floor of said tank, means including a conduit for delivering liquid to be treated to said mixing chamber, a second partition extending outwardly and upwardly from said first partition from adjacent said mixing chamber outlet to adjacent the wall of said tank, said partition being spaced above the floor of the tank and dividing the lower part of the tank into a lower and an upper flow space, a communication opening between said flow spaces adjacent the periphery of said tank, an inlet to said mixing chamber leading from adjacent the upper surface of said partition, a power driven stream projecting impeller placed to cause flow through said mixing chamber from said inlet to said outlet, an outlet for treated liquid from the upper portion of said tank and a waste discharge from said tank.

5. Apparatus of the type described comprising a tank provided with sloping lower walls, an inverted frusto-conical partition member within the said sloping walls, said partition member dividing the tank into a lower chamber and an upper chamber, flow openings between the two chambers adjacent the center and the outer edge of said partition, a baffle above said outer flow opening so constructed and arranged as to deflect liquid entering said upper chamber through said outer flow opening horizontally inwardly, a stream projecting impeller adjacent said central flow opening and so constructed and positioned relative to said partition and said central flow opening as to cause, on operation thereof, a turbulent downward flow of deflected liquid through said central flow opening, inlet means for introducing water to be treated into the central portion of said tank, inlet means for introducing a chemical reagent into the central portion of said tank, a clarified liquid outlet from the upper portion of the upper chamber, and a solids separator within said tank comprising an auxiliary chamber, an inlet into the upper portion of said auxiliary chamber from said upper chamber and a waste outlet from the lower portion of said auxiliary chamber.

6. Apparatus of the type described comprising a tank provided with sloping lower walls, an inverted conical partition member within the said sloping walls, said partition member dividing the tank into a lower chamber and an upper chamber, an annular flow passage for the flow of liquid from the lower chamber to the upper chamber at the outer edge of said partition, a central flow passage in said partition, inner and outer vertical housings coaxially aligned with respect to said central flow passage and so constructed and arranged as to provide a mixing chamber discharging into the space underneath said partition through said central flow passage, a stream projecting impeller in said mixing chamber, an inlet passageway into the mixing chamber from the upper chamber, inlet means for water to be treated discharging into the mixing chamber, inlet means for a chemical reagent discharging into the mixing chamber, a clarified liquid outlet from the upper portion of the upper chamber, and a solids separator within said tank comprising an auxiliary chamber, an inlet into the upper portion of said auxiliary chamber from said upper chamber and a waste outlet from the lower portion of said auxiliary chamber.

7. The apparatus of claim 2 wherein the conduit is of substantially uniform cross-sectional area across the direction of flow.

8. A process of treating water wherein the water to be treated is mixed with and subjected to reaction in and with a circulating slurry containing particles that have been formed in and accumulated from previously treated liquid while continuously held in suspension, which comprises maintaining a body of slurry in the lower portion of a body of water undergoing treatment; imparting sufficient mechanical impelling energy to said slurry to establish therein a flow pattern of agitation and circulation which includes passing slurry through a central mixing and reaction zone to adjacent the lower limits of said body of slurry, then divergently and upwardly to the upper outer portion of said body of slurry at a substantially uniform velocity, and thence, without decreasing the velocity, convergently and downwardly into said central mixing and reaction zone; delivering water to be treated into said mixing and reaction zone; delivering a chemical reagent into said mixing and reaction zone; displacing an output quantity of treated water from said convergent flow of slurry; removing said displaced treated water from the upper portion of said body of water; separating solids from said convergent flow of slurry to control the amount and density of said body of slurry; and removing said separated solids to waste.

9. A process for treating water wherein the water being treated is mixed and subjected to reaction in and with a slurry containing particles that have been formed in and accumulated from previously treated liquid while continuously held in suspension, which comprises maintaining a body of slurry in the lower portion of a body of water undergoing treatment, establishing a confined turbulent mixing zone in the central part of the body of water undergoing treatment, mixing water entering to be treated and a precipitating reagent in and with a larger volume of slurry in said mixing zone, conducting the mixture from the lower portion of said mixing zone outwardly and upwardly to adjacent the periphery and upper surface of the body of slurry and there discharging the same inwardly, returning discharged slurry inwardly into the mixing zone, imparting mechanical energy to said slurry in said mixing zone to effect said mixing of the same with water and reagent introduced thereto and to maintain the circulation of slurry through said mixing zone to the periphery of said body of slurry and returning to the mixing zone, displacing an output quantity of treated water from the upper surface of the return flow of slurry, removing said displaced treated water from the upper portion of said body of water, separating solids from said return flow of slurry to control the amount and density of said body of slurry, and removing said separated solids to waste.

10. Apparatus of the type described comprising a tank, an inclined partition dividing said tank into a lower chamber and an upper chamber, a passageway between said chambers adjacent the periphery of the tank, baffle means above said peripheral passageway positioned to deflect liquid entering the upper chamber through said passageway inwardly, a second centrally located passageway between said chambers adjacent the center of the said inclined partition and at an elevation below that of said first passageway, means including a stream projecting impeller adjacent said central passageway and so constructed and so positioned relative to said partition and said central passageway as to cause, on operation thereof, a turbulent closed type circulation of liquid from said central passageway through said lower chamber and said peripheral passageway and back to said central passageway along the upper surface of said partition, a prime mover operatively connected to said impeller, means for introducing liquid to be treated into said tank adjacent said impeller, means for introducing a precipitating reagent to said liquid, an outlet for treated liquid from the upper portion of said tank and a waste outlet from said tank.

11. In liquid treating apparatus of the type wherein liquid to be treated is mixed and reacted in and with a circulating slurry comprising suspended particles separated and accumulated from previously treated liquid and treated liquid is separated from such slurry, a tank, means for withdrawing treated liquid from the upper portion of said tank, a partition structure in said tank forming therein a central mixing chamber, an outlet from said mixing chamber into the lower portion of said tank and an inlet into said mixing chamber from a central elevation of said tank, a plurality of conduits leading from said mixing chamber outlet upwardly and outwardly to adjacent the periphery of the tank, a stream projecting impeller so constructed and arranged as to cause a turbulent circulation of slurry in and through said mixing chamber, through said conduits and back to said mixing chamber through said inlet, means for introducing liquid to be treated and treating reagent into the circulation of slurry caused by said impeller, and a waste discharge from said tank.

12. Apparatus of the type described comprising a tank, an inclined partition forming in said tank a lower chamber and an upper chamber, a passageway between said chambers adjacent the periphery of said tank, a second passageway between said chambers adjacent the center of said tank, a mixing chamber above said centrally located passageway, said mixing chamber comprising an inner and outer vertical housing extending upwardly from said central passageway, one of said housings being secured to said partition and opening into the lower chamber through said passageway, and the other of said housings having an inlet passageway communicating with the upper chamber at a level adjacent said partition, the outer of said housings extending above the outlet for treated liquid and the inner housing terminating at a level below said outlet for treated liquid, a stream projecting impeller positioned within said inner housing and operable to cause a turbulent flow of liquid downwardly through said second passageway, a prime mover operatively connected to said impeller, means for introducing a precipitating reagent to said liquid, an outlet for treated liquid from the upper chamber, and a waste outlet from said tank.

FRANK D. PRAGER.